US008585080B2

(12) United States Patent
Trevena et al.

(10) Patent No.: US 8,585,080 B2
(45) Date of Patent: Nov. 19, 2013

(54) AIRBAG ARRANGEMENT

(75) Inventors: Tony Trevena, Vårgårda (SE);
Carl-Johan Svensson, Vårgårda (SE);
Ola Henriksson, Vårgårda (SE); Stefan Andersson, Alingsås (SE); Fredrik Kjell, Alingsås (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/501,270

(22) PCT Filed: Oct. 11, 2010

(86) PCT No.: PCT/SE2010/051092
§ 371 (c)(1),
(2), (4) Date: Apr. 11, 2012

(87) PCT Pub. No.: WO2011/046497
PCT Pub. Date: Apr. 21, 2011

(65) Prior Publication Data
US 2012/0200071 A1    Aug. 9, 2012

(30) Foreign Application Priority Data
Oct. 16, 2009    (DE) .................. 10 2009 049 764

(51) Int. Cl.
*B60R 21/20* (2011.01)
(52) U.S. Cl.
USPC ....................................... 280/730.2
(58) Field of Classification Search
USPC ........................................... 280/730.2, 728.2
See application file for complete search history.

(56) References Cited

U.S. PATENT DOCUMENTS

| 5,333,899 | A  | * | 8/1994  | Witte ........................... 280/730.2 |
| 6,123,355 | A  | * | 9/2000  | Sutherland .................. 280/728.2 |
| 6,338,498 | B1 | * | 1/2002  | Niederman et al. ........ 280/728.2 |
| 6,457,740 | B1 | * | 10/2002 | Vaidyaraman et al. .... 280/730.2 |
| 7,597,342 | B2 | * | 10/2009 | Cheal ........................... 280/728.2 |
| 7,641,228 | B2 | * | 1/2010  | Mansson et al. ............ 280/730.2 |
| 7,967,332 | B2 | * | 6/2011  | Karlsson ..................... 280/730.2 |
| 8,020,888 | B2 | * | 9/2011  | Cheal et al. ................. 280/730.2 |
| 2006/0061071 | A1 | * | 3/2006 | Noguchi et al. ........... 280/730.2 |
| 2006/0157958 | A1 |   | 7/2006 | Heudorfer et al. |
| 2010/0013198 | A1 |   | 1/2010 | Karlsson et al. |
| 2012/0267880 | A1 | * | 10/2012 | Frisk et al. .................. 280/730.2 |

FOREIGN PATENT DOCUMENTS

| DE | 10346010 A1 | 5/2005 |
| GB | 2362139 A | 11/2001 |
| JP | 2008/114631 A | 5/2008 |
| WO | 2006/00800 A1 | 1/2006 |
| WO | 2007/036336 A1 | 4/2007 |
| WO | 2008/077485 A1 | 7/2008 |

OTHER PUBLICATIONS

International Search Report and Written Opinion of the ISA, ISA/SE, Stockholm, mailed Jan. 25, 2011.

* cited by examiner

*Primary Examiner* — Faye M. Fleming
(74) *Attorney, Agent, or Firm* — Harness, Dickey & Pierce, P.L.C.

(57) ABSTRACT

An airbag arrangement with an inflatable curtain airbag for a vehicle includes fixation elements to fix the inflatable curtain airbag to the interior side structure of the vehicle. The airbag further includes an inflatable area to cover parts of the interior side structure of the vehicle. A fender airbag is provided adjacent to the inflatable area and/or the fixation elements of the inflatable curtain airbag. The fender airbag is inflated with a time delay with respect to the inflation of the inflatable area of the inflatable curtain airbag.

20 Claims, 4 Drawing Sheets

AIRBAG ARRANGEMENT

CROSS-REFERENCE TO RELATED APPLICATIONS

This application is a 371 U.S. National Stage of International Application No. PCT/SE2010/051092, filed Oct. 11, 2010, which claims priority to German Patent Application No. DE 102009049764.1, filed Oct. 16, 2009. The entire disclosures of the above applications are incorporated by reference herein.

FIELD

The invention relates to an airbag arrangement.

BACKGROUND

Airbag arrangements with inflatable curtain airbags are in general known. The purpose of the inflatable curtain airbags is to cover certain parts of the interior side structure of the vehicle in the event of an accident and to prevent the occupant from directly hitting on these parts. The inflatable curtain airbag is mounted on the roof liner and is inflated downwards to cover the interior side structure of the vehicle when actuated. The inflatable curtain airbag extends in the inflated state from the A-pillar to the rear pillar, which is the C- or D-pillar, and covers the side windows as well as the pillars. Because of the large surface to be covered it is an important aspect how to fix the airbag and to assure, that the inflatable curtain airbag has sufficient stability to keep the position during and at the end of the inflation for an optimal protection of the occupant. When the window is open the inflatable curtain covers the opening and protects the occupant from moving through the open window to the outside of the vehicle. Therefore the stability of the inflatable curtain airbag is especially important when the window is open.

In the event of severe accidents, like rollovers for example, the occupant hits the inflated curtain airbag with high kinetic energy. Therefore the occupant might move together with the inflated curtain airbag to the outside of the vehicle, when the load is too high for the airbag. Another risk is that the fixation of the inflatable curtain airbag might not withstand the high load in this case. When the fixation is destroyed or damaged because of the high load the movement of the inflatable curtain airbag is not controlled anymore, so that the inflatable curtain airbag does not keep the position as intended.

SUMMARY

In view of that prior art it is the object of the invention to provide an airbag arrangement with an inflatable curtain airbag with an improved stability.

According to the invention it is suggested, that a fender airbag is provided adjacent to the inflatable area and/or the fixation elements of the inflatable curtain airbag, which is inflated with a time delay with respect to the inflation of the inflatable area of the inflatable curtain airbag.

One advantage of the suggested fender airbag is, that the fender airbag provides an unloading of the fixation and the inflatable curtain airbag, which improves the stability of the inflatable curtain airbag and reduces the risk of a damaged fixation with a not controlled inflatable curtain airbag. Because the fender airbag must not disturb the inflation of the inflatable area of the inflatable curtain airbag or change the direction of the inflation of the inflatable area, the fender airbag is inflated with a time delay with respect to the inflation of the inflatable area of the inflatable curtain airbag. When the fender airbag starts to inflate, the inflatable area of the inflatable curtain airbag is therefore already inflated to such an extent, that the inflation of the fender airbag is not changing the orientation of the inflatable area anymore and is only improving the stability of the airbag arrangement.

Furthermore it is proposed, that the fender airbag is arranged between the inflatable area and/or the fixation elements of the inflatable curtain airbag on one side and the interior side structure of the vehicle on the other side. The proposed arrangement of the fender airbag provides a direct support of the inflatable curtain airbag at the interior side structure of the vehicle which further improves the stability of the shape of the inflatable curtain airbag. Especially when the fender airbag is arranged at a part of the side structure adjoining a window, it improves the stability of the inflatable curtain airbag in the area of the window and prevents a movement of the inflatable curtain airbag through the window.

A further preferred embodiment of the invention can be seen in, that the fender airbag and the inflatable area of the inflatable curtain airbag are connected via a flow connection. Because of the provided flow connection it is possible to inflate the fender airbag and the inflatable curtain airbag by one common gas generator, which is reasonable regarding costs and assembly effort.

In this case the flow connection can be designed as a constriction, and the time delay between the inflation of the inflatable area and the fender airbag can be realised by friction of the gas flow in the constriction. The constriction is a very easy and cheap solution to realise the time delayed inflation of the fender airbag, wherein the inflation of the inflatable area and the fender airbag are always in a fixed relation to each other.

It is further suggested, that the fender airbag is located close to an attachment bolt, where the inflatable curtain airbag is fixed to the interior side structure of the vehicle. Thereby the forces acting on the attachment bolt when the occupant hits the inflatable curtain airbag are reduced, because the forces acting on the inflatable curtain airbag are transmitted at least partially via the fender airbag directly into the vehicle structure.

An easy construction with reduced costs for the mounting can be provided, when the fender airbag and the inflatable curtain airbag are fixed at one common attachment bolt to the interior side structure of the vehicle.

The design can be further improved, regarding costs for manufacturing and handling, when the fender airbag is part of the inflatable curtain airbag. The fender airbag can be woven as one chamber of the inflatable curtain airbag, for example in a one piece woven process.

Furthermore it is suggested, that the inflatable curtain airbag is mounted at an attachment bolt which is located above a window, and the fender airbag is located at least partially between the window and the attachment bolt. The arrangement of the fender airbag between the window and the attachment bolt is so far advantageous as the stability of the inflatable curtain airbag is improved especially close to the window. Therefore even when the window is open it is prevented that the inflatable curtain airbag and the occupant may move to the outside of the vehicle. Depending on the acting forces a limited movement of the occupant and/or the inflatable curtain airbag cannot be prevented in some cases, but also in these cases the movement to the outside is at least reduced and the protection of the occupant is improved by the stabilised airbag.

Another preferred embodiment of the invention can be seen in, that the fender airbag is winded around the folded and/or rolled inflatable area prior to the inflation. When the inflatable area is inflated the inflatable area is automatically unfolded or unrolled and the fender airbag is moved to the defined position, where the fender airbag can act as intended.

Furthermore it is suggested, that the inflatable curtain airbag is rolled in a P-roll shape and the inflatable area and the fender airbag are rolled in the P-roll in opposite directions. By rolling the inflatable area and the fender airbag in opposite directions it is assured, that the fender airbag is automatically released from the inflatable area when the inflatable area of the inflatable curtain airbag is inflated.

BRIEF DESCRIPTION OF THE DRAWINGS

In the following the invention is described in more detail with respect to one preferred embodiment. The figures show in detail.

DETAILED DESCRIPTION

Figure 1:
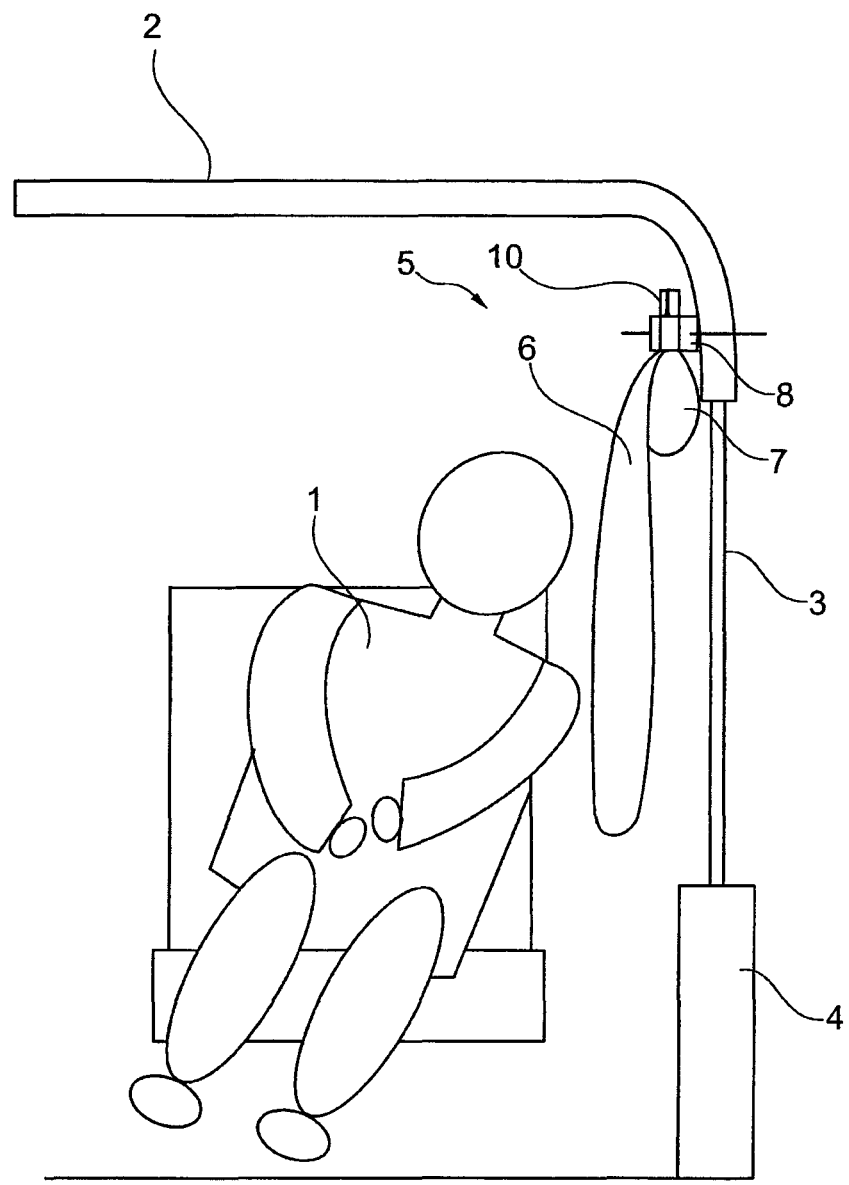
FIG. 1: Airbag arrangement in a vehicle with an inflatable curtain airbag and a fender airbag in view from the front.

FIG. 1 shows an occupant 1 in a passenger compartment of a vehicle during a typical movement caused by a side impact. Different parts of the interior side structure of the vehicle like the roof 2, the window 3 and the door 4 can be seen. At the roof liner, where the roof 2 adjoins the window 3, is fixed an airbag arrangement at an attachment element 8. The attachment element 8 can be designed as a bolt or a clip connection, depending on the requirements from the car manufacturers and the conditions which need to be fulfilled.

The airbag arrangement consists of an inflatable curtain airbag 5 and a fender airbag 7 provided adjacent to the inflatable area 6 and the attachment element 8. The inflatable curtain airbag 5 comprises an inflatable area 6 and a fixation element 10 designed as a lug, to fix the inflatable curtain airbag 5 at the attachment element 8. The inflatable area 6 is shown as one unit structure, which is usually an arrangement of non inflatable sections and inflatable sections depending on the individual side structure of the vehicle. When the inflatable curtain airbag 5 is inflated, the inflatable area 6 is inflated downwards between the occupant 1 and the interior side structure, in this case the window 3. The interior side structure to be covered by the inflatable curtain airbag 5 can also be a part of the roof 2, the door 4 or the A-pillar 16 (see FIGS. 4a and 4b). The fixation element 10 has the function to keep the inflatable area 6 of the inflatable curtain airbag 5 in position for an optimal protection of the occupant 1.

Furthermore a fender airbag 7 is attached via the fixation element 10 to the vehicle structure. The fender airbag 7 extends from the attachment element 8 downwards covering a part of the roof 2 adjoining the window 3 and also a part of the window 3. When actuated the fender airbag 7 is inflated with a time delay with respect to the inflation of the inflatable area 6 of the inflatable curtain airbag 5. Because of the time delay it is prevented, that the fender airbag 7 pushes the inflatable area 6 horizontally over the head of the occupant 1.

In the event of a further movement of the occupant 1 and an impact of the occupant 1 at the inflatable area 6, the forces caused by the impact will be transmitted through the fender airbag 7 into the roof liner of the roof 2. Therefore the fixation element 10 will be unloaded by the fender airbag 7, and the risk of damaging the fixation is reduced. Furthermore the fender airbag 7 supports the inflatable area 6 of the inflatable curtain airbag 5 by abutting on the roof liner and stabilising the shape of the inflatable area 6.

A special advantage of the stabilisation of the inflatable area 6 is the mitigation of the ejection of the inflatable curtain airbag 5 and the occupant 1 through an open window 3 to the outside of the vehicle also in severe accidents. Other possible support surfaces for the fender airbag 7 at the interior side structure of the vehicle would be the pillars, the doors 4 or the like.

Figure 2:
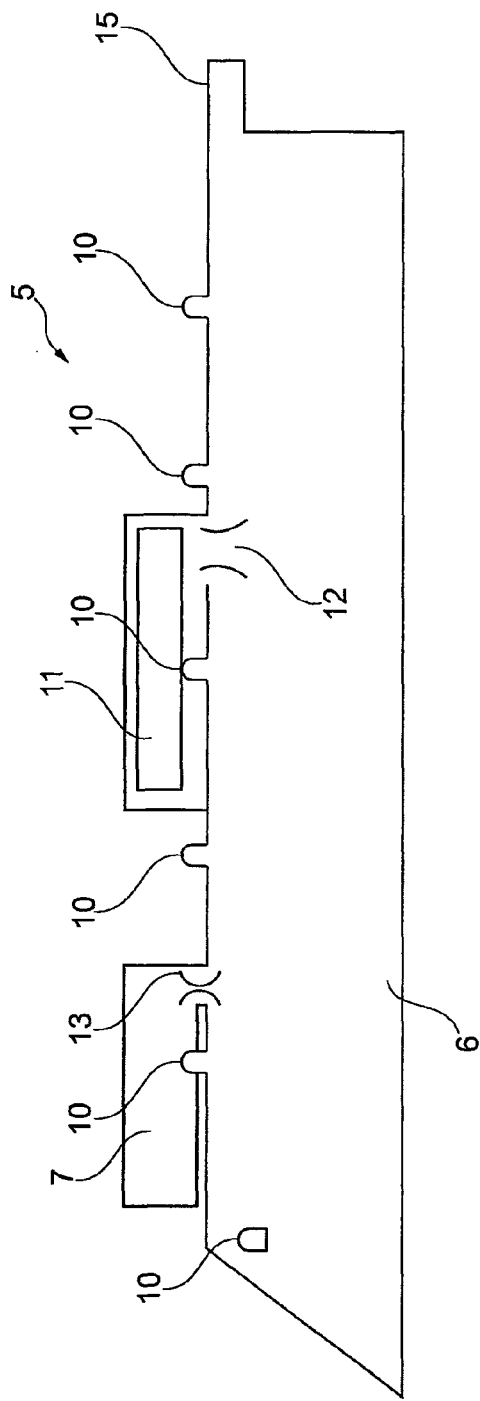
FIG. 2: Inflatable curtain airbag with integrated fender airbag.

In FIG. 2 is shown the inflatable curtain airbag 5 before being mounted on the vehicle. The inflatable curtain airbag 5 comprises an inflatable area 6, a fender airbag 7 and an extra inflatable chamber 11. The inflatable chamber 11 is connected with the inflatable area 6 via a flow connection designed as a channel 12, which is dimensioned in a size, that the chamber 11 is inflated simultaneously or previously to the full inflation of the inflatable area 6. The chamber 11 acts as a ramp for the inflatable area 6 and prevents an inflation of the inflatable area 6 between the vehicle structure and an interior lining. At one end of the inflatable area 6 is provided an inlet 15, to which a not shown gas generator is connectable.

At the top rim of the inflatable area 6 are provided several fixation elements 10 in shape of lugs for the fixation at the attachment elements 8 in FIG. 1. In FIG. 1 is only one fixation bolt 8 visible, but it is clearly understandable that each fixation element 10 is fixed at a separate attachment element 8.

The fender airbag 7 is connected also via a flow connection designed as a channel 13 to the inflatable area 6, which is dimensioned as a constriction. Because of the constriction the fender airbag 7 is inflated with a time delay with respect to the inflation of the inflatable area 6.

Figure 3:
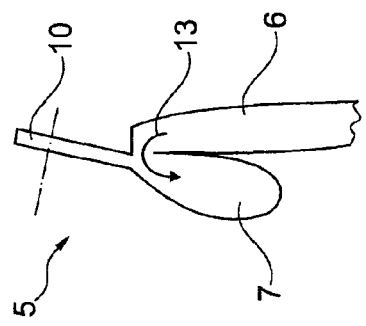
FIG. 3: Inflatable curtain airbag with integrated fender airbag in cross-sectional view.

In FIG. 3 is shown a cross-sectional cut through the inflatable curtain airbag 5 in a level cutting the fixation element 10, the fender airbag 7 and the inflatable area 6. The fender airbag 7 is folded downwards in a position approximately parallel to the inflatable area 6, so that the fixation element 10 is accessible for the fixation at the attachment element 8.

Figure 4A:
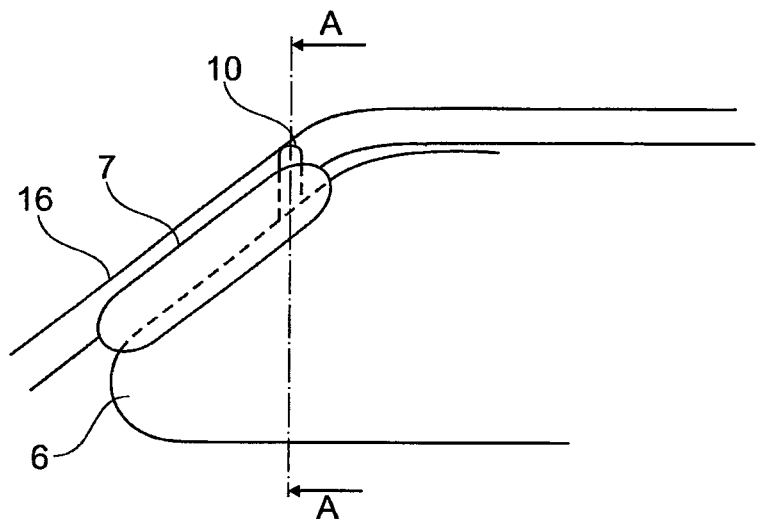
FIG. 4a: Inflatable curtain airbag with a fender airbag arranged at the A-pillar

In FIG. 4a is shown a part of the inflatable curtain airbag 5 covering an A-pillar 16 of the interior side structure. The fender airbag 7 is arranged between the inflatable area 6 of the inflatable curtain airbag 5 and the attachment element 8. Because of the design of the A-pillar the fender airbag 7 extends downwards and forward along the A-pillar. In the inflated state of the fender airbag 7 the fixation element 10 is unloaded, because at least a part of the load caused by the hitting occupant is transmitted via the fender airbag 7 directly into the A-pillar 16 or into a part of the roof liner.

Figure 4B:
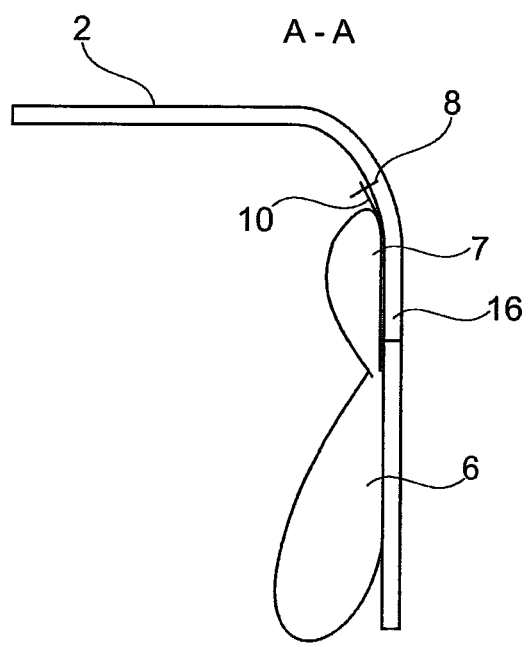
FIG. 4b: Inflatable curtain airbag from FIG. 4a in cutting direction A-A

In FIG. 4b it is shown the arrangement from FIG. 4a in cutting direction A-A. The fender airbag 7 is covering the A-pillar 16 and the fixation element 10. When the occupant hits the inflatable area 6 and/or the fender airbag 7 the load in the fixation element 10 is reduced by the fender airbag 7, so that the fender airbag 7 provides an improved stability and reduced risk of damaging the fixation element 10.

Figure 5:
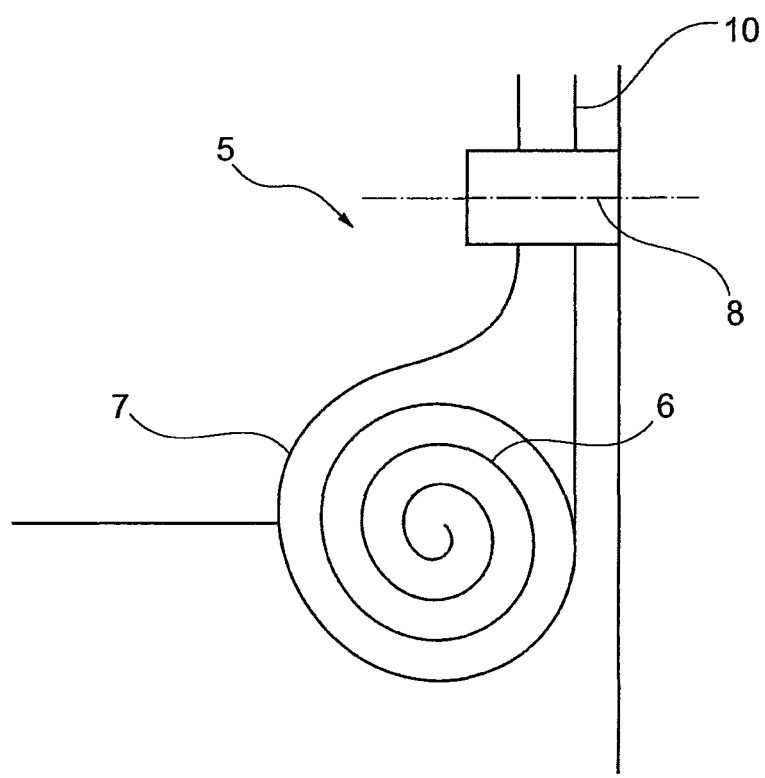
FIG. 5: Inflatable curtain airbag rolled in a P-roll shape

In FIG. 5 is shown the inflatable curtain airbag 5 rolled as a P-roll and fixed via the fixation element 10 at the attachment element 8. The inflatable area 6 of the inflatable curtain airbag 5 is rolled counter clockwise and the fender airbag 7 in clockwise direction. The package of the rolled or folded inflatable curtain airbag 5 may be fixed by an additional wrapper.

The fender airbag 7 may be a chamber of the inflatable curtain airbag 5, or it can also be a separate airbag.

The invention claimed is:

1. An airbag arrangement for a vehicle comprising:
 an inflatable curtain airbag having an inflatable area;
 fixation elements for fixing the inflatable curtain airbag to a structure of the vehicle; and
 a fender airbag adjacent to the inflatable area and/or the fixation elements, the fender airbag inflated with a time delay with respect to inflation of the inflatable area of the inflatable curtain airbag;
 wherein the inflatable curtain airbar is rolled in a P-roll and the inflatable area and the fender airbag are rolled in the P-roll in opposite directions.

2. The airbag arrangement according to claim 1, wherein the fender airbag is arranged between the inflatable area and/or the fixation elements of the inflatable curtain airbag on one side and the structure of the vehicle on the other side.

3. The airbag arrangement according to claim 1, wherein the fender airbag and the inflatable area of the inflatable curtain airbag are connected via a flow connection.

4. The airbag arrangement according to claim 3, wherein the flow connection is a constriction, and the time delay between the inflation of the inflatable area and the fender airbag is realized by friction of a gas flow in the constriction.

5. The airbag arrangement according to claim 1, wherein the fender airbag is located close to an attachment element, the inflatable curtain airbag fixed to the structure of the vehicle.

6. The airbag arrangement according to claim 1, wherein the fender airbag and the inflatable curtain airbag are fixed at one common attachment element to the structure of the vehicle.

7. The airbag arrangement according to claim 1, wherein the fender airbag is part of the inflatable curtain airbag.

8. The airbag arrangement according to claim 5, wherein the inflatable curtain airbag is mounted at an attachment element which is located above a window, and the fender airbag is supported by a part of the structure between the window and the attachment element.

9. The airbag arrangement according to claim 1, wherein the fender airbag is wound around the inflatable area prior to the inflation.

10. An airbag arrangement for a vehicle comprising:
 an inflatable curtain airbag having an inflatable area, the inflatable curtain airbag rolled in a P-roll prior to inflation; and
 a fender airbag arranged upon inflation between the inflatable curtain airbag and a structure of the vehicle inflated with a time delay with respect to the inflation of the inflatable area of the inflatable curtain airbag;
 wherein the inflatable area and the fender airbag are rolled in the P-roll in opposite directions.

11. The airbag arrangement of claim 10, further comprising a common fixation element for fixing the inflatable curtain airbag and the fender airbag to the vehicle.

12. The airbag arrangement of claim 10, wherein the fender airbag is inflated with a time delay with respect to the inflation of the inflatable area of the inflatable curtain airbag.

13. The airbag arrangement of claim 10, wherein the fender airbag is defined by a chamber of the inflatable curtain airbag.

14. The airbag arrangement of claim 12, wherein the fender airbag and the inflatable area of the inflatable curtain airbag are connected via a flow connection.

15. The airbag arrangement of claim 14, wherein the flow connection is a constriction, and the time delay between the inflation of the inflatable area and the fender airbag is realized by friction of a gas flow in the constriction.

16. The airbag arrangement of claim 10, wherein the inflatable area is inflatable in a downward direction between an occupant and an interior side structure of the vehicle.

17. A curtain airbag comprising:
 a first inflatable portion, the first inflatable portion rolled in a P-roll prior to inflation; and
 a second inflatable portion dependent from the first inflatable portion;
 wherein the first inflatable portion and the second inflatable portion are rolled in the P-roll in opposite directions.

18. The curtain airbag of claim 17, wherein the second inflatable portion is inflated with a time delay with respect to inflation of the first inflatable portion.

19. The curtain airbag of claim 18, wherein the first and second inflatable portions are connected at a flow connection.

20. The curtain airbag of claim 19, wherein the flow connection is a constriction, and the time delay between the inflation of the first inflatable portion and the second inflatable portion is realized by friction of a gas flow in the constriction.

* * * * *